United States Patent [19]
Rossi et al.

[11] Patent Number: 5,859,159
[45] Date of Patent: Jan. 12, 1999

[54] DILUTE PROCESS FOR THE POLYMERIZATION OF NON-ETHYLENE α-OLEFIN HOMOPOLYMERS AND COPOLYMERS USING METALLOCENE CATALYST SYSTEMS

[75] Inventors: Albert Rossi, Warren, N.J.; Salvatore Rea, Franklin Square, N.Y.; Jon E. Stanat, Westfield, N.J.; Linda K. Wright, Somerville, N.J.; Kenneth L. Kaufman, Teaneck, N.J.; Jeffrey W. Frederick, Morris Plains, N.J.; Robert Martin Koros, Westfield, N.J.; Harold Wilbur Margo, Colonia, N.J.

[73] Assignee: Exxon Chemical Patents Inc., Linden, N.J.

[21] Appl. No.: 818,373

[22] Filed: Mar. 14, 1997

Related U.S. Application Data

[63] Continuation of Ser. No. 257,398, Jun. 9, 1994, abandoned, which is a continuation-in-part of Ser. No. 992,690, Dec. 17, 1992, abandoned.

[51] Int. Cl.[6] ........................................ C08F 2/14
[52] U.S. Cl. .......................... 526/176; 526/160; 526/943; 526/348.2; 526/348.4; 526/348.6; 526/351; 585/502; 585/510
[58] Field of Search ..................................... 526/160, 170, 526/290, 943; 585/502, 510

[56] References Cited

U.S. PATENT DOCUMENTS

| | | | |
|---|---|---|---|
| 4,665,208 | 5/1987 | Welborn et al. | 556/179 |
| 4,871,705 | 10/1989 | Hoel | 502/117 |
| 4,937,299 | 6/1990 | Ewen et al. | 526/119 |
| 4,962,248 | 10/1990 | Winter et al. | 585/12 |
| 5,017,714 | 5/1991 | Welborn | 556/12 |
| 5,055,438 | 10/1991 | Canich | 502/117 |
| 5,057,475 | 10/1991 | Canich | 502/104 |
| 5,064,802 | 11/1991 | Stevens et al. | 502/155 |
| 5,096,867 | 3/1992 | Canich | 502/103 |
| 5,120,867 | 6/1992 | Welborn | 556/12 |
| 5,153,157 | 10/1992 | Hlatky et al. | 502/117 |
| 5,198,401 | 3/1993 | Turner et al. | 502/155 |
| 5,204,419 | 4/1993 | Tsutsui et al. | 526/153 |

FOREIGN PATENT DOCUMENTS

| | | | |
|---|---|---|---|
| 0025530 | 3/1981 | European Pat. Off. | C08F 110/10 |
| 200351 | 11/1986 | European Pat. Off. | C08F 210/16 |
| 277003 | 8/1988 | European Pat. Off. | C08F 4/64 |
| 277004 | 8/1988 | European Pat. Off. | C08F 4/64 |
| 420436 | 4/1991 | European Pat. Off. | C07F 7/00 |
| 520732 | 12/1992 | European Pat. Off. | C08F 10/00 |
| 552946 | 7/1993 | European Pat. Off. | C08F 210/18 |
| WO91/04257 | 4/1991 | WIPO | C07F 7/00 |
| WO 93/08221 | 4/1993 | WIPO | C08F 210/00 |
| PCT/US93/04991 | 5/1993 | WIPO . | |

*Primary Examiner*—David W. Wu
*Attorney, Agent, or Firm*—J. F. Hunt; H. L. Cohen

[57] ABSTRACT

An improved process for the homopolymerization and copolymerization of α-olefins utilizing highly dilute α-olefin feedstreams to effect high conversions and catalyst efficiencies in the production of non-ethylene copolymers. The instant invention is particularly adaptable to polymerizing the α-olefin content of commercially available refinery feedstreams such as Raffinate-2.

17 Claims, 2 Drawing Sheets

DILUTE PROCESS FOR THE POLYMERIZATION OF NON-ETHYLENE α-OLEFIN HOMOPOLYMERS AND COPOLYMERS USING METALLOCENE CATALYST SYSTEMS

CROSS-REFERENCE

This is a continuation of application Ser. No. 257,398, filed Jun. 9, 1994, now abandoned which is a continuation-in-part of U.S. application Ser. No. 992,690, filed Dec. 17, 1992, now abandoned.

BACKGROUND OF THE INVENTION

This invention relates to a continuous process for the polymerization of α-olefins with a metallocene catalyst system using a dilute α-olefin feed.

Olefin polymerizations, particularly, ethylene/α-olefin copolymerizations can be broadly differentiated as occurring in solution, suspension, or in the gas phase. Within the continuous solution polymerization category, operating conditions can vary quite broadly depending on such variables as the concentration of the reactants in the total feed, the nature of the catalyst system employed, the desired molecular weight of the polymer, and the desired monomer/comonomer ratio within the final polymer.

When concentrated ethylene and α-olefins, e.g., propylene, feeds are copolymerized with conventional Ziegler-Natta catalysts, it is known as described in U.S. Pat. Nos. 3,912,698 and 3,637,616 to conduct such polymerizations continuously to obtain an ethylene copolymer, dissolved in the solvent, which is continuously removed and isolated by known means. Unreacted monomers leaving the reactor are recovered and recycled to the reactor along with fresh monomers to replace those polymerized.

It is also known, as in EPA 270,339, to conduct continuous ethylene/α-olefin copolymerization under highly dilute conditions at atmospheric pressure using conventional Ziegler-Natta catalysts. These processes suffer the drawback that the catalysts exhibit low productivities and produce polymer product exhibiting large molecular weight distributions, high ash content, and number average molecular weights too large to be useful as lubricant additives. Consequently, if low molecular weight polymers are desired either hydrogen must be used to keep the molecular weight of the product low, e.g. less than about 15,000 or the catalyst concentration has to be increased to extremely high levels to obtain low molecular weights. The hydrogen treatment at least partially saturates the terminal double bonds in the product, thereby significantly reducing or destroying the polymer's utility for most functionalization reactions, e.g., those used in the production of dispersants. Saturated polymers have limited applicability for use in subsequent functionalization techniques (e.g., by "ene" reaction with maleic anhydride) which rely on a high terminal double bond content to achieve functionalization.

In contrast, recent developments in the catalyst and α-olefin copolymer art disclose that metallocene catalyst systems yield low molecular weight polymers with high terminal ethenylidine (vinylidene) content directly, without hydrogenation, as well as other advantageous properties (see, EP Publication Nos. 129,368; 440,504; 440,505; 440, 506; 440,507; 440,508; 441,548; PCT Publication Nos. WO 91/11488; WO 90/01503; and U.S. Pat. Nos. 5,017,299; 5,128,056; 5,151,204; 4,704,491; 4,668,834; 4,888,393; and 4,542,199).

More specifically, it is known in the art to employ high pressure/high temperature systems, as in U.S. Pat. No. 5,084,534 and EP Publication 260,999, which utilize pure or nearly pure feeds and metallocene catalyst at pressures up to 2,500 bar and temperatures up to 300° C. Such systems are designed to produce high molecular weight polymers at high catalyst productivities (i.e. grams of polymer produced per gram of catalyst used). These systems suffer a number of drawbacks when applied to low molecular weight polymer production; most notably, expensive pure feeds and specialized equipment resulting in high fixed costs of production.

Also, such systems operate with a single phase to allow efficient mixing of the reactants and, therefore, homogeneity of the product.

A single phase system is achieved by operating at temperatures and pressures sufficiently high to compress the ethylene and make it dense enough to dissolve the polymer product therein. This produces a homogeneous phase of polymer in reactant. To achieve high temperature and reduce the size of the reaction zone the process is run adiabatically (heat is not removed), making temperature control difficult. Since the molecular weight of the product is directly related to temperature, failure to maintain constant temperature throughout the reaction process results in increased polydispersity $\overline{M}_w/\overline{M}_n$ (or Molecular Weight Distribution, MWD). Temperature control becomes increasingly more difficult at higher conversions in an adiabatic system. Consequently, conversions in the high temperature/high pressure process are kept to a minimum, about 10%. For polymers having molecular weight of 100,000 or more, variations of +1,000 or so have little effect on MWD. For polymers on the order of 10,000 number average molecular weight, $\overline{M}_n$, and below, however, such variations are extremely disadvantageous.

Moreover, the use of pure feeds is another limiting factor on the rate of conversion. As the conversion rate in a pure feed system is increased, the concentration of polymer in the reactor increases until it becomes extremely difficult or impossible to mix and pump the reactants efficiently. This problem is exacerbated at a low reaction temperature where the polymer viscosity increases further. The limitations on conversion induced by pure feeds applies to essentially all polymerization processes.

Others have attempted to prepare low molecular weight ethylene α-olefin copolymers (EAO) at low temperatures and pressures, with metallocene catalyst as described in U.S. Pat. No. 4,704,491 to Mitsui Petrochemical Industries and U.S. Pat. No. 4,668,834 to Uniroyal. The process described in the Mitsui '491 patent operates with high catalyst concentrations, e.g., 10-2 moles/liter, pure undiluted vaporized feeds, at atmospheric pressure, extremely short reactant residence time (e.g., about 0.5 hours), with no recycle of unreacted reactants. The high catalyst concentrations are needed because the mass transfer of the reactants into solution is poor and, consequently, low concentrations of reactants appear in solution. Low conversions are the result. The Uniroyal '834 patent operates at super atmospheric pressure with a compressor driven cooling system and pure undiluted feeds.

Methods employing dilute reaction mixtures and utilizing batch processes are known in the art. Typically, dilution of the reaction mixture occurs as a result of employing a metallocene catalyst system in a diluent, usually toluene. However, the use of a dilute feed of α-olefin is not found in this art. Moreover, rapid introduction of reactants into solution is often accomplished by introducing the pure reactants directly into the vapor space of the reactor instead of the liquid phase, or by bubbling the reactants up through the reaction mixture at pressures too low to provide effective dissolution therein. Such processes are also conducted at very low monomer conversions.

KAMINSKY, et al., U.S. Pat. No. 4,542,199, describes a batch process wherein pure ethylene and an α-olefin are introduced into a pressure vessel containing a metallocene catalyst system dissolved in toluene.

LUKER, U.S. Pat. No. 5,023,388 refers to a batch process, wherein the metallocene catalyst system is dissolved in diesel oil in the presence of large quantities of α-olefin and ethylene and hydrogen gas at 7 bar. The molecular weight distribution of the product is reported to be 2.8.

SLAUGH, et al., EP 366,212 published May 2, 1990, teaches continuous or batch processes, though the examples offered are all batch. The feeds used are pure and the reaction mixture is highly concentrated. The process produces polymer wherein 80 percent of the product has less than 20 carbon atoms per molecule.

TSUTSUI, et al., EP 447,035 published Sep. 18, 1991, refers to a series of batch processes, wherein ethylene is first polymerized or copolymerized with α-olefin in a first batch under concentrated or dilute conditions; the product is isolated; and then the product is introduced into a subsequent batch process with ethylene or an α-olefin. The process may be continued to a third round of batch processing. Reactants may be relatively concentrated in one batch, yet relatively dilute in the next or vice-versa.

Another approach, as described by HIROSE, et al., JP 2-173,110 disclosed Jul. 4, 1990, is to recycle massive amounts of ethylene and propylene gas through a solvent-containing reaction vessel. The feeds are pure and the quantity of reactants to solvent is very high. The ratio of ethylene to α-olefin is necessarily very low in order to prevent polyethylene formation. Polymers formed by this process have ethylene contents less than 10 percent by mole.

It is also known in the art to cool polymerization reactors by evaporation and removal of unreacted monomers from the vapor space, these monomers, being optionally cooled, and recycled to the reactor. Reactors cooled in this manner are referred to as evaporatively cooled reactors or boiling reactors. Polymer is recovered from the reaction mixture by withdrawing polymer solution from the reactor and separating unreacted monomers which are usually recycled to the reactor. Also, as a general proposition, as the concentration of the polymer in solution increases, and/or the molecular weight of the polymer increases, the viscosity of the reaction mixture increases. This in turn reduces the mass transfer of monomer from the gas into the liquid phase and reduces the heat transfer properties of the reaction mixture thereby making it more difficult to cool the reaction mixture. As indicated above, failure to maintain a stable reaction temperature leads to fluctuations in the molecular weight of the polymer and a broadening of the molecular weight distribution.

While evaporative cooling reactors improve heat transfer by removing the exothermic heat of reaction, and can maintain stable reaction temperatures, they have the disadvantage that monomer concentration in solution in the reactor is usually less than its equilibrium value. Thus, as a general proposition, in order to produce a copolymer containing a particular proportion of monomer in evaporatively cooled reactors, it is usually necessary to recycle a larger amount of monomer in the reactor off-gas (to obtain the cooling benefit) than would be the case if a sealed reactor were employed and the concentration of monomer in solution in the reactor achieved its equilibrium value. Economically, this increase in recycle volume means greater expense than would otherwise be the case. See U.S. Pat. No. 3,706,719. Moreover, if the reaction temperature is increased above the critical temperature of monomer, the monomer mass transfer problem becomes more acute since the solubility of monomer will be lower, thereby reducing gas/liquid phase mixing.

In addition to monomer imbalance in the vapor space and mass transfer problems, evaporatively cooled reactors also lead to the associated problem of reactor fouling and polymer segment formation. More specifically, because various α-olefins possess different reactivities, they co-polymerize at different rates. Moreover, because more volatile α-olefin homopolymerizes much faster than it copolymerizes with less volatile α-olefin, the copolymerization of more volatile α-olefin with other α-olefins can result in polymers having large crystalline polymer segments randomly interspersed with occasional other α-olefin moieties.

These phenomena not only make it difficult to control the composition in the polymer, reduce the solubility of the polymer in the reaction mixture, and consequently lead to reactor fouling, but also more importantly, they limit the utility of the polymer in applications extremely sensitive to crystallinity such as to make dispersants for lubricating oil compositions.

The conventional solution to controlling polymer content, when using Ziegler-Natta catalysts, has been to regulate the concentrations of α-olefins in the reaction mixture. For example, to obtain a copolymer of propylene and higher α-olefin having approximately 50 mole percent of each monomer in the copolymer, it has been considered that a large excess of higher α-olefin, e.g., greater than 10:1 mole ratio, is necessary in the catalyst-containing solution in the reactor. In contrast, a copolymerization conducted in a solution containing about equal amounts of propylene and higher α-olefin, produces a copolymer so high in propylene content, that under ordinary Ziegler-Natta polymerization conditions, e.g., about −20° to about 80° C., it would not be soluble in the saturated hydrocarbon solvents used as the polymerization medium. However, when propylene and higher α-olefin, for example, are polymerized in a reactor having both liquid and vapor phases, the mole or weight ratio of higher α-olefin to propylene in the vapor phase is typically far less than the corresponding ratio in the liquid phase because of the greater volatility of propylene. For example, if the higher α-olefin:propylene mole ratio in the liquid phase is about 10:1, the mole ratio in the vapor phase above it may be only about 1:1 to about 3:1.

Uniformity of monomer incorporation, known as "compositional distribution", is also a function of the mass transfer into the reaction zone, i.e., uniform mixing of the co-monomers. However, as discussed above, in those reactor designs which employ recycle of the vapor phase, e.g., using a reflux condenser, the reflux condensate returning to the reactor will typically have sufficiently high more volatile monomer concentration such that reactor agitation of fresh and recycled monomer alone will not suffice to prevent insoluble polymers having randomly high more volatile monomer content from forming and clogging up the system. Consequently, it has been conventional in the art to attempt to introduce process steps for reducing the more volatile monomer content in the recycled condensate, e.g., by removing more volatile monomer from the condensate before introduction into the polymerization reactor. See U.S. Pat. Nos. 3,706,719 (col. 5, line 68 et seq.); 3,637,616; and 3,912,698. Such steps are costly and inefficient.

Separate and distinct from the need to control monomer ratio in the recycle stream are the mass transfer problems associated with employing pure feeds, particularly mixed pure feeds, even when supplied to reaction zones employing a solvent which dilutes the pure feed as it is introduced into the reactor. For example, the introduction of pure feeds into liquid reaction mixtures necessarily creates a higher concentration gradient of monomer at its point of introduction relative to the remainder of the reactor. Thus a finite amount of time will be required to achieve uniform mixing of the monomer into the reaction mixture. As long as this higher concentration gradient exists, there will be a propensity to form higher molecular weight polymer species relative to the molecular weight of polymer species formed at monomer equilibrium concentrations, since molecular weight is a function of monomer concentration. Broadened MWD and non-uniform compositional distribution are a result.

In view of the above, there has been a continuing need to develop more cost efficient processes for preparing olefin copolymers with metallocene catalyst systems; the present invention was developed in response to this need.

SUMMARY OF THE INVENTION

The invention is a continuous process for producing non-ethylene polymer comprising monomer units derived from at least one α-olefin in the presence of a metallocene catalyst system and in a reaction zone containing liquid phase, comprising: continuously introducing into the liquid phase of a reaction zone (i) a metallocene catalyst system and (ii) a dilute liquified α-olefin feed stream comprising at least one α-olefin and diluent wherein the amount of diluent is at least 30 weight percent of said feed stream; and continuously withdrawing polymer product from the reactor.

The use of dilute monomer feeds results in a lower concentration gradient at the point of monomer introduction into the reactor and, consequently, less time is required to achieve uniform monomer mixing and less time is available for higher molecular weight species formation at the input port.

The use of dilute feeds enables the process to operate at high conversion rates of comonomer/α-olefin without the attendant buildup of mass transfer resistance attributable to polymer formation in pure feed systems.

The process of the present invention may employ a boiling reactor and dilute feed enables the employment of a system wherein α-olefins in the vapor space and in the liquid reaction mixture are in, or close to, equilibrium. This is achievable because the reaction mixture gives essentially no mass transfer resistance at the liquid/vapor interface because uniform mixing is easily obtained; because of high metallocene catalyst system conversion of more volatile α-olefin the amount of unreacted more volatile α-olefin entering the vapor space is minimized; minimization of vapor buildup of less volatile α-olefin facilitates recycle of more volatile α-olefin and does not hinder recycle of the α-olefin.

Still further improvements are made possible by employing a feed diluent, such that the major constituents of the diluent boil at about the same temperature as the α-olefin in the optional case of a boiling reactor. Accordingly, not only is the volatile α-olefin content in the vapor space low to begin with (as discussed above) but it is further diluted by the less volatile α-olefin feed constituents, a major portion of which is diluent. Thus, (i) the evaporative cooling does not depend on recycle of high amounts of more volatile α-olefin in the vapor; (ii) more volatile α-olefin buildup in the reflux is further minimized; and (iii) mass transfer resistance to more volatile α-olefin mixing is further reduced.

Also, for the boiling reactor, fouling caused by any buildup of less volatile α-olefin at the reflux return port and attendant polymer formation is easily avoided since the more volatile α-olefin is also more reactive than any less volatile α-olefin, the proportion of less volatile α-olefin to more volatile α-olefin is typically greater in the vapor space than in the feed (occasionally may be equal to or slightly less than that in the feed), and the concentration of more volatile α-olefin in the vapor space is typically less than that in the feed. Uniformity of polymer is greatly enhanced without the need for manipulation of the condensed vapor to alter its compositional distribution.

The combined use of dilute feed and high conversion facilitates removal of catalyst residue (deashing) and quenching of the polymer/catalyst mixture since it is easier to mix the polymer with quench media and optional deashing media.

Use of dilute α-olefin containing feeds and high conversion not only permits adaptation of metallocene catalyst systems to evaporatively cooled reactors but also allows for a significant improvement in the overall economics of the process because such dilute feeds can be readily obtained at very low cost as by-product streams derived from other commercial sources.

The present invention permits the use of residence time as a controller of conversion so as to permit formation of final product with the most minimal quantities of catalyst. The effects of catalyst concentration and conversion upon the molecular weight of the product may be offset by "fine tuning" the molecular weight with the reaction temperature.

DETAILED DESCRIPTION OF THE INVENTION

Figure 1:
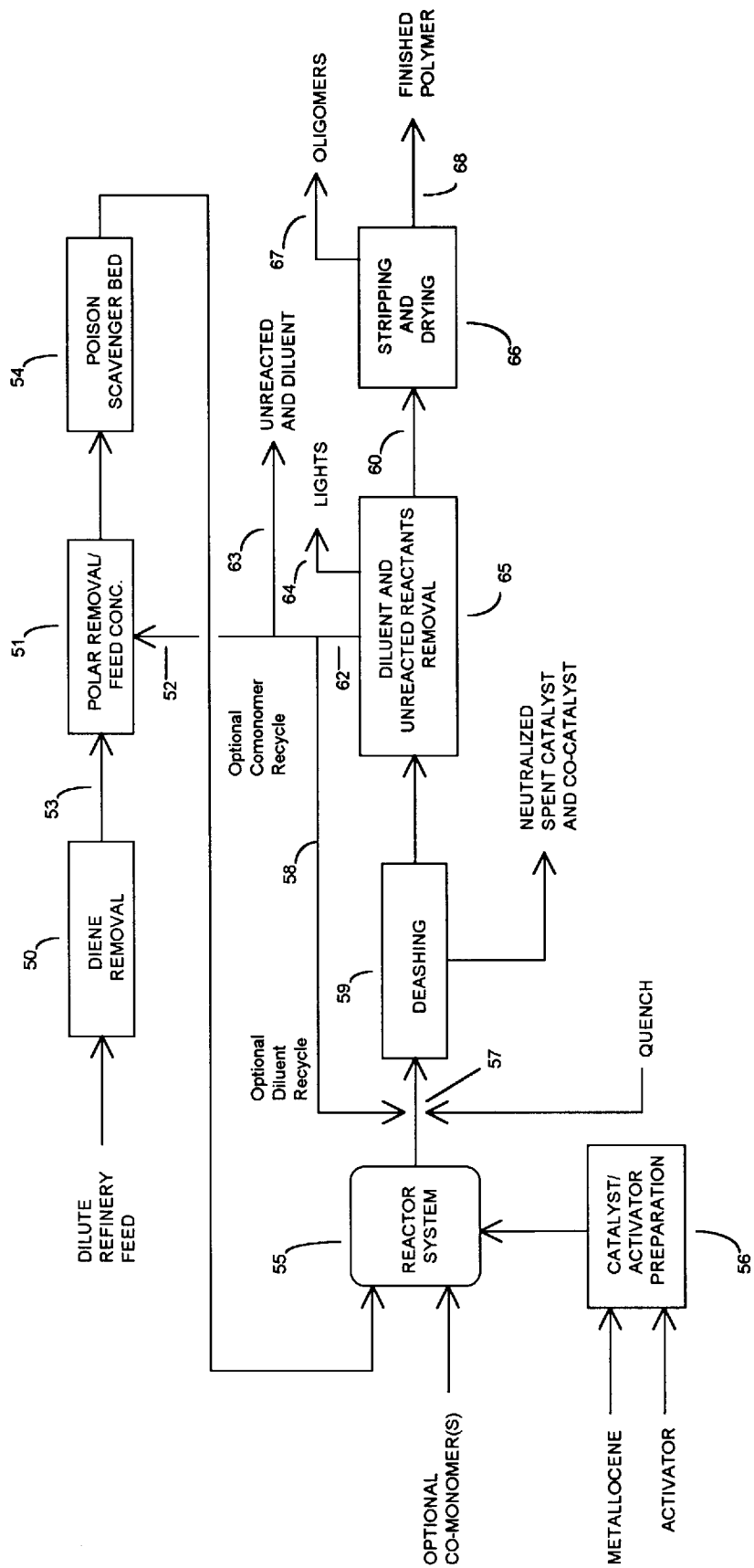
FIG. 1 is a flow diagram of the dilute feed polymer process.

Conventional Ziegler-Natta olefin polymerizations generally use residence time to control molecular weight and monomer and catalyst concentration to control conversion. By using dilute feeds and a metallocene catalyst system, it is found that the following relationships between reaction parameters and polymer production exist:

Temperature is found to control the molecular weight of the product. The relationship is inverse, that is to say that higher reaction temperatures result in lower molecular weight product.

Pressure in a non-boiling reactor does not affect $\overline{M}_n$ or conversion.

Monomer Concentration controls the molecular weight of the product and has little impact on conversion when in the dilute ranges specified in this disclosure. In the dilute system of the present invention dilute monomer concentration will tend to suppress molecular weight.

Catalyst Concentration and Residence Time control both molecular weight and conversion. Higher catalyst concentrations and/or longer residence times result in higher conversions and lower molecular weights. Catalyst concentration and residence time may be used to control conversion and their effect on molecular weight may be compensated by varying temperature. When it is preferred to minimize catalyst use, catalyst concentration can be reduced and residence time extended to provide desired conversion and molecular weight.

The first steps in the process of the present invention are to introduce a dilute refinery stream into a reaction zone and to feed the desired, optionally a minimal, amount of catalyst. Absent other factors, these dilute monomer and catalyst concentrations would result in a suppression of conversion and a higher molecular weight product. However, residence time may be lengthened to provide higher conversion of monomer and to result in lower molecular weight product.

Reactant/catalyst feed rates may be set to achieve a desired residence time.

The result of this process is high conversion and very high catalyst efficiency. Catalyst efficiencies may range from as low as about 1,000 to as high as 1,000,000 weight units of polymer product per weight unit of catalyst utilized (i.e., pounds of product per pound of catalyst). However, by proper use of the present invention catalyst efficiencies on an order of magnitude of 10,000–100,000:1 are easily obtainable.

Polymers produced in accordance with the process of the present invention are non-ethylene polymers comprising monomer units derived from at least one $C_3$ or higher α-olefin and not derived from ethylene. That is, the polymers of the process of this invention are non-ethylene-containing but rather derived from $C_3$ or higher α-olefin(s) to the substantial exclusion of ethylene. Such monomers are characterized by the presence within their structure of at least one ethylenically unsaturated group of the structure >C=CH2. In addition, they are highly reactive at low catalyst concentrations. Metallocene-catalyzed polymerizations are particularly adaptable for use with α-olefin monomers which: a) have at least one hydrogen on the 2-carbon (hence, isobutylene polymerizes extremely poorly); b) have at least two hydrogens on the 3-carbon; or c) have at least one hydrogen on the 4-carbon.

Accordingly, suitable α-olefin monomers include those represented by the structural formula H2C=CHR1 wherein R1 is straight chain or branched chain alkyl radical comprising 1 to 18 or more carbon atoms and wherein the polymer formed therefrom contains a high degree of terminal ethenylidene unsaturation. Preferably R1 in the above formula is alkyl of from 1 to 8 carbon atoms, and more preferably is alkyl of from 1 to 2 carbon atoms. Therefore, useful monomers include propylene, butene-1, pentene-1, 4-methylpentene-1, hexene-1, octene-1, decene-1, dodecene-1, tridecene-1, tetradecene-1, pentadecene-1, hexadecene-1, heptadecene-1, octadecene-1, nonadecene-1 and mixtures thereof (e.g., mixtures of propylene and butene-1, and the like). Notice that isobutylene is not a suitable monomer and is virtually unreactive in the presence of metallocene catalyst. Isobutylene is useful, however, as a solvent.

The process of the present invention may be controlled to make polymer having a number average molecular weight ($\overline{M}_n$) of not greater than about 20,000 and typically from about 300 to 15,000 (e.g., from 300 to 10,000), preferably from about 900 to 8,000; more preferably from about 1,000 to 5,000 (e.g., from about 1,000 to 3,000). The $\overline{M}_n$ for such polymers can be determined by several known techniques. A convenient method for such determination is by size exclusion chromatography (also known as gel permeation chromatography (GPC)) which additionally provides molecular weight distribution information, see W. W. Yau, J. J. Kirkland and D. D. Bly, "Modern Size Exclusion Liquid Chromatography", John Wiley and Sons, New York, 1979.

Where oil solubility is desired, the polymers produced in the process of this invention exhibit a very low degree of crystallinity such that they are essentially amorphous. Other polymers of the invention, especially certain homopolymers (e.g., polybutene-1) may exhibit a high degree of crystallinity.

The polymers produced in this invention are further characterized in that up to about 95% or more of the polymer chains possess terminal ethenylidene-type unsaturation. Thus, one end of such polymers will be of the formula POLY-C(T1)=CH2 wherein T1 is C1 to C18 alkyl, preferably C1 to C8 alkyl, and more preferably C1 to C2 alkyl, (e.g., methyl or ethyl) and wherein POLY represents the polymer chain. The chain length of the T1 alkyl group will vary depending on the comonomer(s) selected for use in the polymerization. A minor amount of the polymer chains can contain terminal vinyl unsaturation, i.e. POLY-CH=CH2, and a portion of the polymers can contain internal monounsaturation, e.g. POLY-C(T1)=CH(T2), wherein T1 and T2 are as defined for T1 above.

The polymer products of this inventive process comprise polymer chains which can be saturated by hydrogen but preferably contain polymer chains wherein at least about 30, preferably at least about 50, more preferably at least about 60, and most preferably at least about 75 percent (e.g. 75–98%), of which exhibit terminal ethenylidene (vinylidene) unsaturation. The percentage of polymer chains exhibiting terminal ethenylidene unsaturation may be determined by FTIR spectroscopic analysis, titration, (H)NMR, or C13NMR.

The molecular weight distribution (Mw/Mn) of the copolymers will be typically less than about 5, preferably less than about 4, and most preferably less than about 3, e.g. between 1.5 and 2.5.

The preferred alpha-olefin monomers derived from dilute alpha-olefin containing refinery streams, include butene-1 from Raffinate-2, and propylene. Most preferred is the copolymerization of butene-1 with propylene for the production of propylene/butene-1 polymers useful in the manufacture of dispersants.

The process of the present invention utilizes a metallocene catalyst system. Such metallocenes are extremely unreactive with non-terminal olefins, and terminal olefins which lack at least one hydrogen atom on the second carbon (e.g., isobutylene), at least two hydrogens on the third carbon (e.g., isopentene), or at least one hydrogen on the fourth carbon (e.g., 4,4-dimethylpentene-1). Hence, as described hereinafter, many of the components in refinery streams, such as Raffinate-2 (e.g. 2-butenes, and isobutylene) are essentially non-reactive in a metallocene system and become suitable diluents for use in the present process which need not be separated from the feed. Other constituents such as 1,2-butadiene may be made non-reactive by pre-saturating the double bonds with hydrogen.

METALLOCENE CATALYST SYSTEMS

The process of this invention can be utilized with catalyst in which the catalyst is preferably a bulky ligand transition metal compound. The bulky ligand may contain a multiplicity of bonded atoms, preferably carbon atoms, forming a group which may be cyclic with one or more optional heteroatoms. The bulky ligand may be a cyclopentadienyl derivative which can be mono- or polynuclear. One or more bulky ligands may be bonded to the transition metal atom. The transition metal atom may be a Group IV, V or VI transition metal ("Group" refers to an identified group of the Periodic Table of Elements, comprehensively presented in "Advanced Inorganic Chemistry," F. A. Cotton, G.

Wilkinson, Fifth Edition, 1988, John Wiley & Sons). Other ligands may be bonded to the transition metal, preferably detachable by a cocatalyst such as a hydrocarbyl or halogen leaving group. The catalyst is derivable from a compound of the formula

[L]mM[X]n wherein L is the bulky ligand, X is the leaving group, M is the transition metal and m and n are such that the total ligand valency corresponds to the transition metal valency. Preferably the catalyst is four coordinate such that the compound is ionizable to a 1+ valency state.

The ligands L and X may be bridged to each other and if two ligands L and/or X are present, they may be bridged. The metallocenes may be full-sandwich compounds having two ligands L which are cyclopentadienyl groups or half-sandwich compounds having one ligand L only which is a cyclopentadienyl group.

For the purposes of this patent specification the term "metallocene" is defined to contain one or more cyclopentadienyl moiety in combination with a transition metal of the Periodic Table of Elements. In one embodiment the metallocene catalyst component is represented by the general formula (Cp)mMRnR'p wherein Cp is a substituted or unsubstituted cyclopentadienyl ring; M is a Group IV, V or VI transition metal; R and R' are independently selected halogen, hydrocarbyl group, or hydrocarboxyl groups having 1–20 carbon atoms; m=1–3, n=0–3, p=0–3, and the sum of m+n+p equals the oxidation state of M. In another embodiment the metallocene catalyst is represented by the formulas:

(C5R'm)pR"s(C5R'm)MeQ3—p—x and

R"s(C5R'm)2MeQ' wherein Me is a Group IV, V, or VI transition metal C5R'm is a substituted cyclopentadienyl each R', which can be the same or different is hydrogen, alkenyl aryl alkaryl or arylalkyl radical having from 1 to 20 carbon atoms or two carbon atoms joined together to form a part of a C4 to C6 ring, R" is one or more of or a combination of a carbon, a germanium, a silicon, a phosphorous or a nitrogen atom containing radical substituting on and bridging two C5R'm rings or bridging one C5R'm ring back to Me, when p=0 and x=1 otherwise x is always equal to 0, each Q which can be the same or different is an aryl alkyl, alkenyl, alkaryl, or arylalkyl radical having from 1 to 20 carbon atoms or halogen, Q' is an alkylidene radical having from 1 to 20 carbon atoms, s is 0 or 1 and when s is 0, m is 5 and p is 0, 1 or 2 and when s is 1, m is 4 and p is 1.

Various forms of the catalyst system of the metallocene type may be used in the polymerization process of this invention. Exemplary of the development of metallocene catalysts in the art for the polymerization of ethylene is the disclosure of U.S. Pat. No. 4,871,705 to Hoel, U.S. Pat. No. 4,937,299 to Ewen, et al. and EP-A-0 129,368 published Jul. 26, 1989, and U.S. Pat. Nos. 5,017,714 and 5,120,867 to Welborn, Jr. These publications teach the structure of the metallocene catalysts and include alumoxane as the cocatalyst. There are a variety of methods for preparing alumoxane, one of which is described in U.S. Pat. No. 4,665,208.

For the purposes of this patent specification, the terms "cocatalysts or activators" are used interchangeably and are defined to be any compound or component which can activate a bulky ligand transition metal compound. In one embodiment the activators generally contain a metal of Group II and III of the Periodic Table of Elements. In the preferred embodiment, the bulky transition metal compound are metallocenes, which are activated by trialkylaluminum compounds, alumoxanes both linear and cyclic, or ionizing ionic activators or compounds such as tri(n-butyl) ammonium tetra(pentafluorophenyl) boron, which ionize the neutral metallocene compound. Such ionizing compounds may contain an active proton, or some other cation associated with but not coordinated, or only loosely coordinated to the remaining ion of the ionizing ionic compound. Such compounds are described in EP-A-0520 732, EP-A-0 277 003 and EP-A-0 277 004 published Aug. 3, 1988, and U.S. Pat. Nos. 5,153,157; 5,198,401 and 5,241,025. Specific teachings directed to bis(cyclopentadienyl) ionic activated systems can be found in U.S. Pat. No. 5,153,157. Further, the metallocene catalyst component can be a monocyclopentadienyl heteroatom containing compound. This heteroatom is activated by either an alumoxane or an ionic activator to form an active polymerization catalyst system to produce polymers useful in this invention. These types of catalyst systems are described in, for example, PCT International Publication WO 92/00333 published Jan. 9, 1992, U.S. Pat. Nos. 5,057,475; 5,096,867; 5,055,438 and 5,227,440 and EP-A-0 420 436, WO 91/ 04257. In addition, the metallocene catalysts useful in this invention can include non-cyclopentadienyl catalyst components, or ancillary ligands such as boroles or carbollides in combination with a transition metal. Additionally, it is not beyond the scope of this invention that the catalysts and catalyst systems may be those described in U.S. Pat. No. 5,064,802 and PCT publications WO 93/08221 and WO 93/08199 published Apr. 29, 1993. The catalyst system of the invention may be, optionally, prepolymerized or used in conjunction with an additive or scavenging component to enhance catalytic productivity; a scavenging component such as an organoaluminum or alkyl aluminum reagent.

THE REACTION PROCESS

The process of the present invention is continuous, employs a dilute feed, and is operated to achieve a high conversion of α-olefin and high catalyst efficiencies as defined herein. Within these parameters, the α-olefin product may be controlled to have a $\overline{M}_n$ of not greater than 15,000 using a metallocene catalyst system as described above.

For purposes of this invention "continuous" means that monomer feed and metallocene system are continuously introduced into the reaction zone and resultant product continuously withdrawn.

The catalyst concentration will preferably be the minimum needed to control the reaction. A certain minimum amount will be required because poisons in the feed and even the metal walls of a reactor will deactivate a small portion of the catalyst. The concentration of catalyst needed to overcome whatever deactivators are present will be referred to herein as the "poison level." Typically, catalyst concentrations (gmol/l) from about $1.0 \times 10^{-6}$ to about $1.0 \times 10^{-4}$ over and above the poison level will be utilized, generally from about $2.0 \times 10^{-6}$ to about $5.0 \times 10^{-5}$, preferably from about $3.0 \times 10^{-6}$ to about $4.0 \times 10^{-5}$.

The catalyst concentration is typically held just above the poison level due to cost of the catalyst. Preferably the feed is treated to remove most if not all catalyst poisons. Minor poison contamination can be accommodated by increasing the catalyst system concentration with the excess used to remove the poison by reaction therewith.

Accordingly, while any effective catalyst concentration can be employed it is contemplated that such effective amounts will be sufficient to achieve a weight ratio of polymer product to metallocene catalyst of typically from about 10,000:1 to 1,000,000:1, preferably 150,000–750,000:1.

The residence time for the liquid reaction is determined from the equation:

$$Res.\ time = \frac{total\ vol.\ of\ liquid\ in\ reactor}{total\ vol./time\ of\ liquid\ exiting\ reactor}$$

Residence times will vary typically from about 0.1 hours to about 10.0 hours, generally from about 0.5 hours to about 5.0, and preferably from about 0.75 hour to about 4.5 hours, e.g., 1.0 to 4.0 depending upon the reactants used and the conversion desired.

As described above, certain dilute $\alpha$-olefin refinery streams are preferred. The diluent can be any non-reactive (under the conditions employed) material which preferably is: (i) capable of being liquified under reaction conditions; (ii) capable of dissolving at least the $\alpha$-olefin monomer(s) employed; and (iii) capable of dissolving or at least suspending the polymer product under reaction conditions such that viscosity buildup is sufficiently minimized to the extent that the mass transfer rate of any volatile monomer(s) (e.g., propylene) needed to homogeneously distribute the volatile monomer(s) throughout the reaction zone is at least equal to, and preferably greater than, the reaction rate. Suitable, but less preferred, diluents include such solvents as alkanes, aromatic hydrocarbons, and nonreactive alkenes. It is contemplated that the non-reactive diluents comprise typically at least 30, preferably at least 40, and most preferably at least 50 weight % of the $\alpha$-olefin feed stream and the diluent can range typically from about 30 to 90 preferably from about 40 to 80, and most preferably from about 50 to 60 weight % of the $\alpha$-olefin feed stream before admixture with any comonomers that may be desired.

It is a particular advantage of the present invention that the preferred diluents are naturally present in various refinery streams containing $\alpha$-olefin monomer reactants. Such streams to be useful must contain at least one $\alpha$-olefin as the reactive constituent. However, these streams typically will contain non-reactive constituents which have a similar carbon number to the $\alpha$-olefin.

For an optional boiling reactor or one operated close to boiling, the similarity in carbon number causes the non-reactive constituents to have similar boiling points to the $\alpha$-olefin. Consequently, the non-reactive constituents will vaporize at similar rates to the $\alpha$-olefin and not only dilute the $\alpha$-olefin in the vapor space, but also any other $\alpha$-olefin comonomer.

For a boiling reactor system a preferred diluent will contain components comprising typically at least 50, preferably at least 75, and most preferably at least 95 weight %, and typically from about 50 to about 100, preferably from about 75 to 100, and most preferably from about 95 to 100 weight % thereof, having a boiling point at the reaction conditions of typically within about +20, preferably within about +15, and most preferably within about +10° C. of the average boiling point of the $\alpha$-olefin constituents of the feed. Representative of such refinery streams are those which contain butene-1, propylene or C5 $\alpha$-olefin. Preferred butene-1 containing streams are referred to herein as Raffinate-2 Streams. Such streams typically have had isobutylene content significantly lowered in relation to the stream from which they are derived. Raffinate-2 is typically derived from either butane/butene catalytic cracking refinery streams (BB-streams) or Raffinate-1 which, in turn, is derived from butadiene crude produced by steam cracking plants.

The composition of Raffinate-2 can vary widely, depending upon the source, e.g., (weight %):

| Component | Crude Butadiene | Raff-1 | Raff-2 From Crude | BB | Raff-2 From BB |
| --- | --- | --- | --- | --- | --- |
| BUTADIENE | 43.5 ± 20 | 0.1 ± .05 | 0 ± 5 | 0.3 ± .15 | 0.4 ± 0.2 |
| ISOBUTYLENE | 25.2 ± 10 | 44.6 ± 20 | 0 ± 5 | 12.6 ± 6 | 0.2 ± 0.1 |
| BUTENE-1 | 15.5 ± 8 | 27.4 ± 15 | 49.5 ± 25 | 13.6 ± 6 | 15.4 ± 7 |
| CIS-BUTENE-2 | 2.0 ± 1 | 3.5 ± 1.5 | 6.4 ± 3 | 9.0 ± 4 | 10.2 ± 5 |
| TRANS-BUTENE-2 | 6.2 ± 3 | 10.9 ± 5 | 19.6 ± 10 | 13.8 ± 6 | 15.6 ± 7 |
| N-BUTANE | 4.6 ± 2 | 8.1 ± 4 | 14.7 ± 7 | 10.5 ± 5 | 12.0 ± 6 |
| ISOBUTANE | 2.9 ± 1.5 | 5.2 ± 2.5 | 9.4 ± 4 | 36.7 ± 15 | 42.1 ± 20 |
| *OTHER | 0.1 ± 0.5(a) | 0.2 ± .1 | 0.2 ± 0.1(b) | 3.5 ± 1.5 | 4.1 ± 2 |

*Other:
(a) includes propane, propene, pentanes, pentenes, water, trace other hydrocarbons.
(b) Raffinate-2 derived from MTBE production (using BB-stream or Raffinate-1) will include traces of MTBE, methanol, di-methyl ether, and tert-butyl alcohol.

Typical commercially available butene-1 concentrations in Raffinate-2 range from about 15 to about 55 weight %. The above butene-1 containing refinery streams are preferred for making propylene/butene-1 copolymer which has been found to be highly effective as a backbone for the production of lubricants, oil dispersants, and viscosity modifiers. The instant invention may also make use of BB streams and Raffinate-1 directly, since isobutylene is almost entirely unreactive with metallocene catalyst systems. Hence, depending on desired molecular weight, shipping costs, convenience, or other factors, the practitioner has the option of either acquiring Raffinate-2 and running it through the process of the instant invention or first acquiring either Raffinate-1 or a B/B stream, running it through the process, and then shipping the resultant isobutylene-enriched stream on to an MTBE plant or other end use. The use of crude butadiene streams directly is not desired since it would waste butadiene during hydrogenation. It is not necessary that refinery streams be used and, in fact, it is contemplated that dilute $\alpha$-olefin-containing streams can be prepared by separately combining pure $\alpha$-olefin and one or more pure diluents, e.g. pure isobutane, such as those typically found in the above refinery streams.

It will also be seen that this invention is useful in the production of virtually any $\alpha$-olefin copolymer and may therefore be used in the processing of other dilute refinery streams, such as dilute propene and pentene streams common in the industry.

Dilute refinery propene streams, known in the industry as "C3 streams", and dilute refinery pentene streams, known as "C5 streams", are also derived from steam and catalytic cracking and generally can be represented to comprise the following components (ranges, weight %): For C3 streams: Propylene=55±20; Propane=34±15; Ethylene=2±1; Ethane= 8±4; and *Other=1±5. (Other includes methane, acetylenes, propadiene trace C4's and C5's, and trace polar compounds such as water, carbonyl sulfide, methyl mercaptan, and hydrogen sulfide). For C5 streams composition is more complex than that of C3 and C4 streams:

| Component | Range (weight %) |
|---|---|
| 2-METHYL-BUTENE-1 | 9.0 ± 4 |
| 3-METHYL-BUTENE-1 | 1.6 ± 1 |
| PENTENE-1 | 5.1 ± 2 |
| 2-METHYL-BUTENE-2 | 14.9 ± 7 |
| PENTENE-2 | 15.4 ± 7 |
| ISOPRENE | 0.7 ± 0.3 |
| ISOPENTANE | 36.2 ± 5 |
| n-PENTANE | 5.5 ± 2 |
| CYCLOPENTANE | 0.6 ± 0.3 |
| CYCLOPENTENE | 1.5 ± 0.75 |
| PIPERYLENE | 0.9 ± 0.4 |
| C6 OLEFINS | 1.5 ± 0.75 |
| C6 ALKYLS | 3.5 ± 1.5 |
| C7s AND C8s | 2.0 ± 1 |
| *OTHERS | 1.6 ± 1 |

*Others include benzene and polar compounds.

Pentene-1 and cyclopentene are the most reactive components of a C5 stream in the presence of a metallocene catalyst system. The two are easily separated from each other by distillation and are easily concentrated.

Whether a constituent, e.g. of the refinery stream qualifies as a diluent under reaction conditions depends on whether it is non-reactive which in turn depends on the type of pre-treatment to which the feed is subjected. "Non-reactive" when used in conjunction with diluent means that less than 5, preferably less than 3, and most preferably less than 1 wt. % of constituent present in the feed is incorporated into the polymer product and the constituent does not totally deactivate the metallocene catalyst system. Typically any saturated hydrocarbon constituent will qualify as diluent as well as highly unreactive (in the presence of a metallocene catalyst system) unsaturated constituents such as butene-2 and isobutylene. Dienes such as butadiene are prone to deactivate certain catalysts. Hence, it is preferred that dienes be removed or at least partially saturated by hydrogenation. Once saturated, butadiene becomes part of the diluent as butane, butene-2, or reactive butene-1.

The process of the invention is controlled to achieve high monomer conversion at a desired molecular weight. For a given monomer and catalyst concentration, conversion and molecular weight are controlled by residence time and temperature, respectively. Accordingly, the above parameters are controlled to achieve monomer conversions of typically at least about 30%, preferably at least about 50%, and most preferably at least about 70% and can range from about 70–100%. When a comonomer α-olefin is present, conversions (%) are controlled to be typically at least about 30%, preferably at least about 50%, and most preferably at least about 60% and can range typically from about 30% to 95%, preferably from about 40–90% and most preferably from about 50–90%. For propylene as a comonomer, conversion percentages are typically higher than for other α-olefin comonomers.

By controlling residence time to attain the above conversion targets while using the minimal contollable concentration of catalyst, the high catalyst efficiencies that characterize this invention are attained.

Monomer conversion can be determined by the following equation:

$$\% \text{ Conversion} = \frac{\text{wt/hr of monomer incorporated into polymer}}{\text{wt/hr of monomer in feed}} \times 100$$

or by the equation $$\% \text{ Conversion} = \frac{(\text{wt/hr monomer in feed} - \text{wt/hr monomer not reacted})}{\text{wt/hr monomer in feed}} \times 100$$

The particular α-olefin conversion employed depends in part on the monomer content sought to be imparted to the polymer and hence on the monomer concentration in the mixed feed. The monomer concentration in the reaction mixture is kept low through the use of the diluent in the feed. At low monomer content the α-olefin conversion typically will be lower than for high monomer content feeds.

In the optional case of the boiling reactor, preferably, the monomer conversion is controlled in a manner such that the ratio of the weight % of more volatile monomer in the vapor phase to the weight % of more volatile monomer in the reactant feed stream is typically not greater than about 1.2:1, preferably less than 1:1 and most preferably from about 0.1:1 to 0.7:1 (e.g. 0.1:1 to 0.5:1).

Reaction temperature is used to "fine tune" the molecular weight of the polymer product. The combination of temperature and pressure, however, is controlled to liquify the diluent and α-olefin. However, the reaction temperature is typically selected to be below the critical temperature of the α-olefin feed and/or diluent. Accordingly, while any effective temperature can be employed it is contemplated that such effective temperatures for a feed containing butene-1 will range typically from about 30°–150° C., preferably from about 50°–120° C., and most preferably from about 60°–110° C. For the dilute refinery streams of propylene having propane as the major diluent, the critical temperature of propylene and propane are 92.42° C. (198.36° F.) and 96.7° C. (206.06° F.) respectively, so the typical range of reaction temperatures for polypropylene homopolymerization would be 30°–96° C., and preferably from about 60°–92° C. For processes of the invention using an optional α-olefin comonomer, the critical temperature for the feed mixture will vary depending on the amount and volatility of the comonomer.

As indicated above, the optional boiling reactor represents a method for temperature control. Variations on the boiling reactor configuration include internal reflux, e.g. using cooling coils inserted into the vapor space or an external system wherein vapor is removed from the vapor space and introduced to an external reflux apparatus, the vapor condensed and the condensate returned to the reactor and/or feed. Alternative non-reflux temperature control means include pumparound cooling where liquid is removed from the reactor, cooled, and then returned to the reactor. Pumparound cooling offers the added advantage of being able to return cooled liquid to the reactor using high pressure pumps to also provide mixing of reactor contents with high speed jets.

Reactor pressures are typically controlled to maintain the diluent and α-olefin in liquid form at the selected temperature. Thus, pressures are generally used to maintain the reaction mixture in one phase, above the liquefying pressure point. Increasing pressure above the liquefying point has little effect on the process or product. In boiling reactors the pressure is selected to obtain boiling of the diluent/α-olefin reactor constituents at the reaction temperature. Accordingly while any effective pressure can be employed it is contemplated that such effective pressures for butene-1 feeds will range typically from about 2.4 to about 39 ATM, preferably from about 4.4 to about 28 ATM, and most preferably from about 5.6 to about 24 ATM.

The reaction mixture is preferably vigorously mixed by any suitable means such as impeller, jet pump, or vigorous boiling or combinations thereof. Baffles and strategic placement of feed input can be employed to further facilitate mixing.

More specifically, the molecular weight distribution (MWD=$\overline{M}w/\overline{M}_n$) of the polymer is broadened by variations of temperature, monomer concentration, and catalyst concentration.

THE INTEGRATED PROCESS

Referring now to FIG. 1, there is depicted a schematic diagram of the overall process scheme. A dilute propylene, butene, or pentene refinery feed is piped to a diene removal system 50. It may be desirable to remove or saturate any dienes that may contaminate the feed since dienes tend to either poison metallocene catalyst systems, crosslink polymer chains, or both. However, this step in the process is an option since dilute refinery streams vary widely in composition and, therefore, may have virtually no diene contamination or, in fact, none at all.

The next step in the process is to carry the refinery stream to an optional concentration system 51 where more volatile ("lights") and less volatile ("heavies") components as well as catalyst-poisoning polar compounds, such as water, sulfides, alcohols, and nitrogen, sulfur, and oxygen derivatives in general may be removed so as to bring the weight percent of the olefin monomer in relation to the nonreactive diluents to within the range desired. In cases where it is desired to recycle unreacted olefin monomer and/or to further dilute a refinery feed having excess concentration of olefin monomer, a recycle stream 52 may be combined with the input stream 53. The source of this recycle stream will be discussed below in connection with the diluent removal system 65.

After optionally removing polar poisons and adjusting the concentration it is preferable to pass the feed through a scavenger bed system 54 that removes any remaining catalyst poisons and filters out any particulates. The pre-treated dilute refinery feed emanating therefrom is piped to the preferred boiling reactor system 55.

Figure 2:
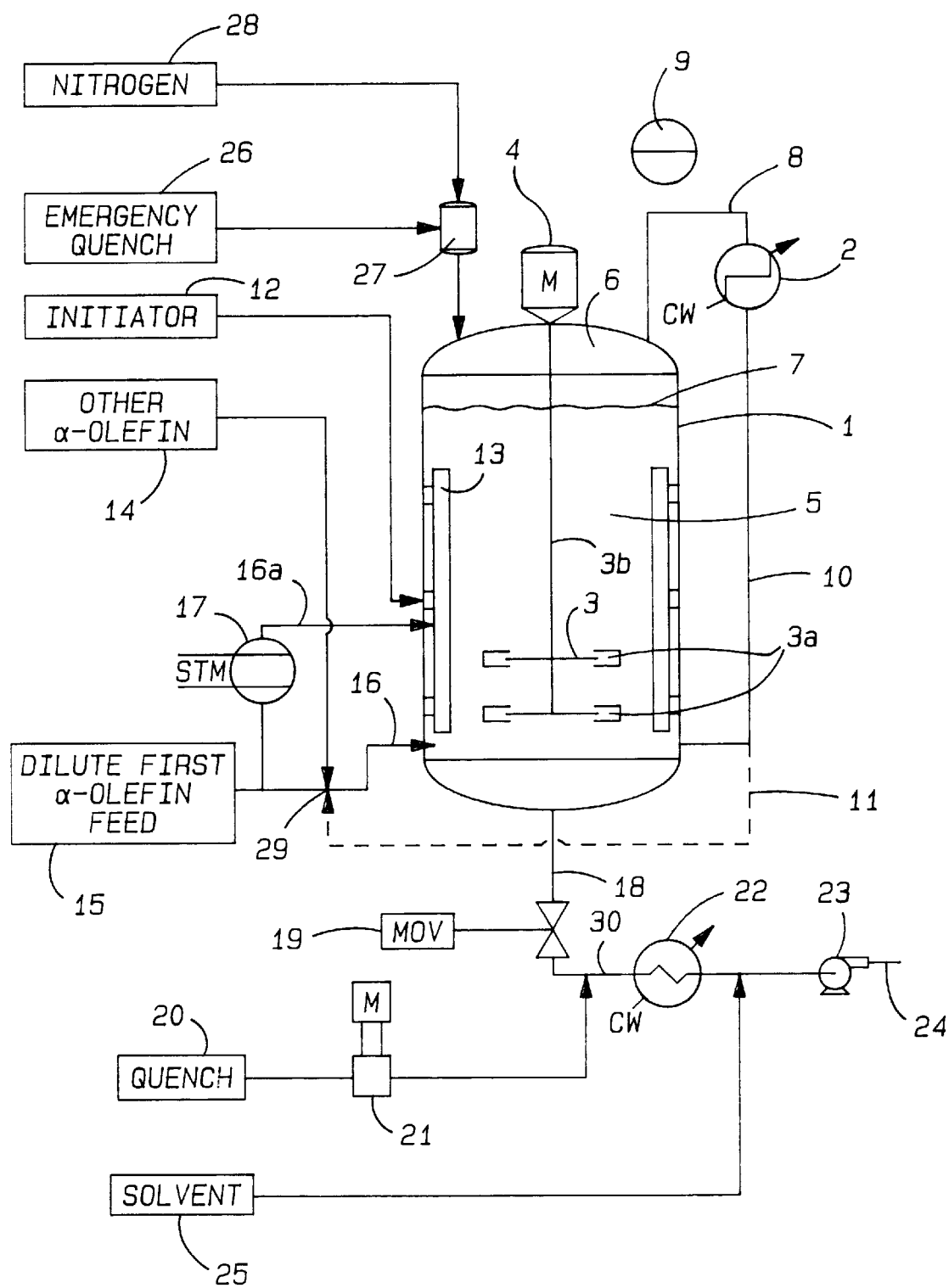
FIG. 2 is a schematic view of an optional reflux boiling reactor system.

Depicted in detail in FIG. 2 is the optional boiling reactor for optionally co-polymerizing with a comonomer. There is provided a reactor vessel 1 having an external reflux condenser 2 in fluid communication therewith via gas space 6, conduit 8, and condensate return conduit 10. Analyzer means 9 monitors the concentrations of unreacted gaseous reactants flowing from the gas space to condenser 2 through line 8. Within the reactor vessel 1, there is provided an agitator 3 having one or more blades 3a and driven via a rotating shaft 3b affixed to a motor 4. During the continuous reaction, there will exist a gas space 6 over a liquid reaction phase 5 within the reactor vessel 1. The gas/liquid interface 7 is depicted by a wavy line. Baffles 13 are provided to increase turbulent mixing and eliminate vortexing of the liquid phase by creating axial mixing patterns. The metallocene catalyst system is fed into the reactor through line 12. A comonomer in liquid, vapor, or liquid/vapor form may be fed through line 14 and liquified dilute α-olefin is fed through line 15. The olefin feeds are mixed at a juncture 29 prior to injection into the reactor vessel through line 16. The purpose being to dissolve the comonomer feed into the diluent prior to contact with the catalyst so as to prevent the comonomer from unduly reacting with itself rather than the α-olefin. For the same reasons, a pre-cooler (not shown) may be employed at this point to aid in dissolving gaseous comonomers in the diluent. Note that pre-dissolving may be further enhanced by running the reflux line 10 to the juncture 29 via an extension 11 rather than injecting the reflux directly into the reactor vessel. As stated above, a unique aspect of the process of this invention is that the reflux is usually more dilute, and higher in olefin monomer concentration relative to volatile comonomer concentration, than in the feed.

For start-up, a heat exchanger 17 may be employed to bring the reaction mixture up to operating temperature by injecting a heated dilute/α-olefin feed through line 16a. When the reactor fills and comes to the desired operating temperature the catalyst and admixed feeds are injected. Also provided is an emergency quench vessel 27, filled via a quench feed 26 and pressurized by an inert gas line 28, which may rapidly inject its contents into the reactor in the event of a runaway reaction. Any polar compound such as alcohols are suitable for emergency quench. The products dissolved in diluent, as well as unreacted reactants and initiator, exit through line 18 past an isolation valve 19 and are quenched by a quench feed 20 of any suitable polar compound driven by a pump 21. Since the pressure in line 30 is generally lower than in the reactor, a cooling heat-exchanger 22 is employed to recondense any diluent that may have flashed. Gases in the reactor output would reduce the efficiency of the centrifugal pump 23 that drives the product stream line 24. For especially viscous products, such as those with high propylene content and/or large molecular weights, it may be desirable to add solvent via a solvent feed 25 to the product stream.

Returning again to FIG. 1, also entering the reactor system 55 would be the metallocene catalyst system which, if not shipped to the process plant premixed, would be mixed on site in a catalyst mixing system 56. After quenching, the quenched polymer solution is passed through a deashing system 59 where metallic components from the spent catalyst and possibly the quench solution are removed. Note that if a supported catalyst system is used, the quenching and deashing steps would be replaced with a catalyst removal, reactivation, and recycle system. The mixture/solution of diluents, unreacted reactants, and polymer is carried to a diluent removal process 65 where preferably three streams result: the first, nearly pure polymer product 60; the second, unreacted olefin monomer dissolved in diluent 62, preferably more dilute than the refinery feed entering the concentration system 53 for the situations where the dilute refinery feed entering the concentration system is already more concentrated in olefin monomer than desired; and a third 64 composed of "non-condensable" such as trace unreacted volatile comonomer, methane, nitrogen, and the like. The second stream 62 may be used to dilute excessively viscous polymer solution resulting from the reactor system 55 as described above. Where this is not necessary, this stream may be diverted as an unreacted olefin monomer recycle 52 or otherwise disposed of, 63. In cases where olefin monomer conversion is so high that recycling is unnecessary, the unreacted olefin monomers may be diverted for other uses, such as to a refinery for processing.

The third gaseous stream 64 containing "lights" may be used as fuel gas or sent to a flare, absent some other use.

The nearly pure polymer product at this point will nevertheless contain traces of diluent and unreacted olefin dissolved within it as well as small amounts of extremely low molecular weight "light" polymers. Also, trace quantities of water will be present where the quench was in aqueous solution. Hence, the product stream is sent to a stripping process 66 via Line 60 which eliminates the last of the water, reactants, and solvents. Preferably, the "light" polymers are sent via line 67 to the refinery pipestills to be reintroduced into the cracker and the now nearly pure polymer product emerges from line 68 to be piped to a holding vessel.

The invention is described in more detail, though only by way of illustration, in the following examples.

EXAMPLES 1–19

Preparation of 1-Butene-Propylene Copolymer n-Butane (99 wt. % minimum purity), 1-butene (99 wt. % minimum purity), and propylene (99.9 wt. % minimum purity) were separately fed as liquids under helium pressure to a stirred mixing tank (working capacity=150 lbs.) to form a liquefied pre-reaction feed mixture composed of propylene, 1-butene, and n-butane diluent. The liquefied pre-reaction mixture was then continuously passed using pressurized argon or helium through a series of two treatment beds containing activated alumina or calcium chloride and four treatment beds containing 3A molecular sieves to remove traces of moisture and the polar components from the pre-reaction mixture. The pre-reaction mixture was then continuously fed into the bottom of a temperature-controlled, baffled, 1.5-liter stirred reactor. Reactor residence time was set by the feed rate. Reactor pressure was maintained at 1800 kPa gauge.

At the same time, a solution of catalyst and cocatalyst was separately and continuously fed to the reactor. Catalyst concentration in the reactor was set by manipulation of the catalyst solution feed rate in conjunction with the pre-reaction mixture feed rate. The catalyst-cocatalyst solution had been earlier prepared under nitrogen by adding racemic 1,1-dimethylsilanyl-bridged bis(4,5,6,7-tetrahydroindenyl) zirconium dichloride catalyst dissolved in toluene to a 10 wt. % solution of methylaluminoxane (MAO; molecular weight=1000; aluminum content=5.93 mole %) in toluene, followed by addition of further toluene to obtain the final solution. All toluene employed was molecular sieve-dried.

The product stream was continuously removed from the top of the reactor, quenched with a dilute aqueous solution of caustic, scrubbed with water to remove the caustic, passed through a heat exchanger to heat the stream, and flashed by venting to atmospheric pressure to remove unreacted monomer and n-butane from the polymer product.

Table 1 summarizes and further describes the polymerization conditions employed and the composition and properties of the resulting polymer product. Mass balance closure for all of the runs was about 89–100%. Conversions were calculated using feed and unreacted vent gas rates and compositions. Most of the polymer products were tested and found to be oil soluble.

The Examples showed that longer residence time, higher temperature, and higher catalyst concentration resulted in increased conversion and lower molecular weights. Variation of catalyst Al:Zr ratio did not show significant effect on conversion or $\overline{M}_n$.

EXAMPLES 20–22

Preparation of Poly-1-Butene

The polymerization was performed as described above for Examples 1–19, except that propylene was not part of the feed. The process conditions and polymer properties are shown in Table 1.

EXAMPLE 23

Preparation of 1-Butene-Propylene Copolymer

The continuous polymerization was performed as described for Examples 1–19, except that isobutylene and a mixture of cis- and trans-2-butenes (containing traces of butadiene) were fed to the stirred mixing tank in addition to propylene, 1-butene, and n-butane, using pressurized argon. The five liquid feedstreams were fed to the tank in the proportions necessary to form a propylene-containing simulated Raffinate II pre-reaction mixture having the following composition, based on the total weight of the mixture including diluents, as determined by gas chromatography: propylene, 5.94 wt. %; isobutane, 8.73 wt. %; n-butane, 18.97 wt. %, 1-butene, 34.50 wt. %; isobutylene, 2.05 wt. %; cis-2-butene, 11.28 wt. %; trans-2-butene, 18.31 wt. %; 1,3-butadiene, 0.04 wt. %; and unknown impurities, balance. The Al:Zr mole ratio was about 1000:1 for Examples 1–23. The process conditions and product properties are shown in Table 2.

EXAMPLE 24

Preparation of 1-Butene-Propylene Copolymer

The continuous polymerization was performed on a propylene-containing simulated Raffinate II pre-reaction mixture in the same manner as in Example 23 except the polymerization was conducted in a smaller, 1.2-liter reactor having operational capability at higher pressures and using racemic dimethylsilanyl-bridged bis(indenyl) $ZrCl_2$. The pre-reaction mixture had the following composition, based on the total weight of the mixture including diluents, as determined by the amounts of each component fed to the stirred mixing tank: propylene, 4.4 wt. %; isobutane, 7.7 wt. %; n-butane, 20.1 wt. %, 1-butene, 39.2 wt. %; isobutylene, 1.9 wt. %; and cis- and trans-2-butene, 26.8 wt. %. The process conditions and polymer properties are shown in Table 2.

EXAMPLE 25

Preparation of 1-Butene-Propylene Copolymer

The continuous polymerization was performed substantially as described for Example 1, except the polymerization was conducted in a smaller, 1.2-liter reactor having operational capability at higher pressures and isobutane was used as the diluent instead of n-butane. The pre-reaction mixture had the following composition, based on the total weight of the mixture including diluents, as determined by the amounts of each component fed to the stirred mixing tank from the appropriate reservoirs: propylene, 4.6 wt. % (=15 mole % propylene, based on the total moles of monomer in the feed); isobutane, 60.9 wt. %; and 1-butene, 34.5 wt. %. The process conditions and polymer properties are shown in Table 2.

EXAMPLES 26–28

Preparation of Poly-1-Butene

The continuous polymerization was conducted as described in Example 24 on a simulated Raffinate II pre-reaction mixture which contained no propylene and had the following composition, based on the total weight of the mixture including diluents, as determined by the amounts of each component fed to the stirred mixing tank: isobutane, 8 wt. %; n-butane, 21 wt. %; 1-butene, 41 wt. %; isobutylene, 2 wt. %; and cis- and trans-2-butene, 28 wt. %. The catalyst of Example 1 was used for Examples 26 and 28 but the catalyst of Example 24 was used for Example 27. Table 2 provides the process conditions data obtained on the resulting polymer. The Al:Zr ratio was about 1150:1 in Examples 24–28.

EXAMPLES 29–31

Preparation of 1-Butene-1-Hexene Copolymer

The polymerization was performed as described for Example 1, except that (i) the 1-butene containing feed was 1-butene and butane diluent; (ii) no propylene was fed to the mixing tank; and (iii) 1-hexene was fed directly to the reactor. The process conditions and polymer properties are shown in Table 3. The catalyst of Example 1 was used in all of Examples 29–34. The percentages of ethenylidene (i.e., vinylidene), trisubstituted, vinylene, and vinyl terminating the polymer chains were determined by proton NMR. The polymers had about 43–77% terminal vinylidene unsaturation, 13–38% trisubstituted olefin unsaturation, 7–19% vinylene unsaturation, and trace—6% vinyl unsaturation.

EXAMPLES 32–33

Preparation of 1-Butene-1-Hexene Copolymer

The continuous polymerization was conducted as for Example 24, except that no propylene was fed to the stirred mixing tank and 1-hexene was fed directly to the reactor, such that the reactor contained a 1-hexene-containing simulated Raffinate II reaction mixture. The pre-reaction mixture in the mixing tank contained simulated Raffinate II having the composition described for Example 26. The process conditions and results are shown in Table 3. The polymer of Examples 29, 30, 32, and 33 were tested for and found to have oil solubility; a 2 wt. % solution of the polymer product in S150N mineral oil formed a haze-free solution.

EXAMPLE 34

Preparation of 1-Butene-1-Octene Copolymer

The polymerization was performed as in Example 29, except that 1-octene was fed directly to the reactor instead of 1-hexene. The process conditions employed are in Table 3. The Al:Zr mole ratio was about 1000:1 in Examples 29–31 and about 1150:1 in Examples 32–33.

The isotacticity was measured for the polymers prepared in Examples 3, 15, 22, 24, 26–28, 32, and 33. In all cases the isotactic index was at least 80%. The polymers prepared in the other Examples would be expected to have similar isotacticities, because they were prepared under the same or substantially similar experimental conditions.

The isotactic poly-1-butenes prepared with $\overline{M}_n$'s below about 1,500 have oil solubility. For example, the poly-1-butene of Example 27 ($\overline{M}_n$=1,542; 87% isotactic) is oil soluble, but the poly-1-butenes of Example 22 ($\overline{M}_n$=1,936; 87% isotactic) and Example 28 ($\overline{M}_n$=3,840; 93% isotactic) are not. In contrast, the isotactic 1-butene-propylene copolymers exhibit oil solubility at molecular weights significantly above 1,500; e.g., Example 3 ($\overline{M}_n$=2,919; >80% isotactic), Example 15 ($\overline{M}_n$=3,739; 94% isotactic), and Example 24 ($\overline{M}_n$=3,100; 94% isotactic) are all oil soluble. The isotactic 1-butene-1-hexene copolymers exhibit oil solubility at relatively high molecular weights; e.g., the oil soluble copolymer prepared in Example 32 has $\overline{M}_n$=4,490 and an isotactic index of 90%.

The poly-1-butenes also have higher heats of fusion relative to 1-butene-propylene copolymers with about the same or even substantially higher degrees of polymerization. Thus, the isotactic poly-1-butene of Example 22 ($\overline{M}_n$=1,936) has a heat of fusion of 36 joules per gram, whereas the isotactic 1-butene-propylene copolymer of Example 3 ($\overline{M}_n$=2,919) has a heat of fusion of only 6 joules per gram. The relatively low heats of fusion exhibited by the 1-butene-propylene copolymers are indicative of low crystallinity; this despite their high isotactic index.

TABLE 1

| Ex. No. | 1-butene in feed Wt. % (1) | Propylene in feed, wt. % (1) | Residence Time (mins.) | Reaction Temp. (deg. C.) | Catalyst Concentration (g-mol/ liter × 10−5) (2) | 1-Butene Conversion (%) | Propylene Conversion (%) | Mn (3) | MWD (3) |
|---|---|---|---|---|---|---|---|---|---|
| 1 | 41.0 | 14.6 | 30.0 | 80 | 0.36 | 27.2 | 30.4 | 3,027 | 2.35 |
| 2 | 61.4 | 17.5 | 30.0 | 90 | 0.36 | 44.7 | 42.7 | 2,943 | 2.45 |
| 3 | 61.4 | 17.5 | 30.0 | 90 | 0.36 | 51.4 | 52.7 | 2,919 | 2.22 |
| 4 | 41.0 | 11.3 | 239.0 | 60 | 0.16 | 78.1 | 87.1 | 3,183 | 2.45 |
| 5 | 58.4 | 20.3 | 30.0 | 90 | 0.36 | 51.8 | 57.6 | 3,226 | 2.04 |
| 6 | 41.0 | 7.2 | 31.1 | 80 | 2.96 | 68.2 | 87.9 | 1,467 | 1.83 |
| 7 | 41.0 | 7.2 | 31.1 | 90 | 2.96 | 72.4 | 93.2 | 1,042 | 1.67 |
| 8 | 43.2 | 6.6 | 47.6 | 80 | 1.60 | 74.4 | 94.5 | 1,395 | 1.71 |
| 9 | 43.2 | 6.6 | 30.8 | 60 | 0.36 | 28.8 | 50.9 | 5,371 | 2.43 |
| 10 | 43.2 | 6.6 | 71.6 | 60 | 3.41 | 73.5 | 86.1 | 2,973 | 2.30 |
| 11 | 43.2 | 6.6 | 32.8 | 80 | 3.12 | 70.8 | 85.0 | 1,477 | 1.76 |
| 12 | 42.8 | 6.4 | 29.5 | 100 | 2.81 | 75.1 | 83.8 | 815 | 1.48 |
| 13 | 42.8 | 6.4 | 30.8 | 100 | 0.37 | 42.6 | 59.3 | 1,211 | 1.83 |
| 14 | 42.8 | 6.4 | 59.9 | 100 | 0.36 | 66.9 | 79.7 | 937 | 1.93 |
| 15 | 42.8 | 6.4 | 29.5 | 60 | 2.81 | 60.5 | 76.6 | 3,739 | 2.06 |

TABLE 1-continued

| Ex. No. | 1-butene in feed Wt. % (1) | Propylene in feed, wt. % (1) | Residence Time (mins.) | Reaction Temp. (deg. C.) | Catalyst Concentration (g-mol/ liter × 10−5) (2) | 1-Butene Conversion (%) | Propylene Conversion (%) | Mn (3) | MWD (3) |
|---|---|---|---|---|---|---|---|---|---|
| 16 | 10.7 | 1.8 | 58.9 | 60 | 2.80 | 12.9 | 54.4 | 2,180 | 2.09 |
| 17 | 10.7 | 1.8 | 90.0 | 80 | 1.60 | 29.6 | 59.5 | 992 | 1.82 |
| 18 | 56.1 | 10.3 | 30.8 | 80 | 0.37 | 32.4 | 44.8 | 3,548 | 2.29 |
| 19 | 56.1 | 10.3 | 45.0 | 100 | 0.40 | 46.9 | 59.8 | 1,730 | 2.29 |
| 20 | 43.0 | — | 45.0 | 80 | 2.86 | 71.8 | — | 1,069 | 1.67 |
| 21 | 43.0 | — | 30.0 | 80 | 2.83 | 67.9 | — | 1,285 | 1.74 |
| 22 | 43.0 | — | 31.0 | 80 | 0.37 | 36.9 | — | 1,936 | 2.02 |

(1) Weight percents are based on the total weight of 1-butene, propylene, and n-butane diluent in the feed.
(2) The catalyst concentration in the reactor was calculated for a temperature of 25° C. and is based on total volumetric flow rate of initiator solution and pre-reaction mixture entering the reactor.
(3) $M_n$ and MWD were determined by gel permeation chromatography using a PIB standard.

TABLE 2

| Ex. No. | Residence Time (mins.) | Reaction Temp. (deg. C.) | Reaction Pressure (kPa gauge) | Catalyst Concentration (g-mole/ liter × 10−5) (1) | 1-Butene Conversion (%) | Propylene Conversion (%) | Mn (1) | MWD (1) | Propylene Content (mole %) (2) |
|---|---|---|---|---|---|---|---|---|---|
| 23 | 30 | 70 | 1,800 | 2.9 | 63.4 | 79.1 | 3,275 | 1.88 | nd* |
| 24 | 90 | 60 | 2,425 | 4.4 | 68.0 | 75.0 | 3,100 | 3.18 | 18 |
| 25 | 30 | 60 | 1,700 | 2.8 | 58.8 | 58.9 | 2,880 | 1.68 | 20 |
| 26 | 45 | 80 | 1,700 | 2.9 | 45–50 | — | 6,933 | 1.89 | — |
| 27 | 45 | 80 | 1,700 | 2.9 | 55–69 | — | 1,542 | 1.68 | — |
| 28 | 45 | 105 | >1,700 | 2.9 | nd | — | 3,840 | 1.91 | — |

(1) The catalyst concentration in the reactor was calculated for a temperature of 25 degrees C. and is based on total volumetric flow rate of the catalyst-cocatalyst solution and the pre-reaction feed mixture entering the reactor.
(2) The propylene content of the polymer was determined by carbon-13 NMR.
*nd = not determined.

TABLE 3

| Ex. No. | 1-butene in feed Wt. % (1) | Comonomer in feed, wt. % (2) | Reactor Pressure (kPa gauge) | Residence Time (mins.) | Reaction Temp. (deg. C.) | Catalyst Concentration (g-mole/ liter × 10−5) (3) | 1-Butene Conversion (%) | Comonomer Conversion (%) | Mn (4) | MWD (4) | Comonomer Content (mole %) (5) |
|---|---|---|---|---|---|---|---|---|---|---|---|
| 29 | 36.3 | 9.2 | 1,800 | 30 | 80 | 2.95 | 62 | 100.0 | 1,477 | 1.72 | 1-Hexene 21.2 |
| 30 | 36.3 | 9.2 | 1,800 | 30 | 60 | 2.84 | 57 | 69.9 | 3,365 | 2.32 | 1-Hexene 17.2 |
| 31 | 34.2 | 14.5 | 1,800 | 30 | 60 | 2.87 | 50 | 52.6 | 3,969 | 2.25 | 1-Hexene 22.9 |
| 32 | 41.0 | 21.3 | 1,700 | 45 | 80 | 3.10 | 57 | 47.0 | 4,490 | 3.26 | 1-Hexene 13.0 |
| 33 | 41.0 | 21.3 | 2,200 | 45 | 105 | 2.80 | 33 | 38.0 | 2,282 | 3.62 | 1-Hexene 17.0 |
| 34 | 35.1 | 12.4 | 1,800 | 30 | 60 | 2.87 | 50 | 57.7 | 3,723 | 2.25 | 1-Octene 16.9 |

(1) Weight percents are based on the total weight of 1-butene, diluent, and comonomer entering the reactor in the 1-butene-containing feed and the comonomer feed.
(2) The weight percent comonomer is based upon the total weight of 1-butene, other C4 olefins, if any, comonomer, and diluent entering the reactor in the 1-butene-containing feed and in the comonomer feed.
(3) The catalyst concentration in the reactor was calculated for a temperature of 25 degrees C. and is based upon total volumetric flow rate of the initiator solution, the 1-butene-containing feed, and the comonomer feed entering the reactor.
(4) $M_n$ and MWD were determined by gel permeation chromatography using a PIB standard.
(5) The comononer content of the polymer was determined by carbon-13 NMR.

What is claimed is:

1. A continuous process for polymerizing olefins other than ethylene comprising: continuously introducing into a liquid phase of a reaction zone (i) a metallocene catalyst system and (ii) a dilute liquefied α-olefin feed stream from a refinery or a steam or catalytic cracking plant comprising at least one α-olefin and diluent, wherein said α-olefin is of the formula $H_2C=CHR1$, wherein R1 is an alkyl group of from 1 to 18 carbon atoms, wherein the amount of diluent is at least 30 weight percent of said feed stream; and continuously withdrawing polymer product from the reactor.

2. The process of claim 1 further comprising introducing into said reaction zone at least one α-olefin comonomer.

3. The process of claim 1 further comprising carrying out the reaction with a catalyst concentration and residence time to obtain at least about 30% conversion of said at least one α-olefin.

4. The process of claim 3 wherein said catalyst concentration is at least about $1.0 \times 10^{-6}$ g-mole/liter.

5. The process of claim 3 wherein said residence time is at least about 30 minutes.

6. The process of claim 1 wherein said metallocene catalyst system comprises a metallocene catalyst and is carried out to achieve a catalyst efficiency of at least about 10,000:1 weight ratio polymer to metallocene catalyst.

7. The process of claim 1 comprising carrying out the process at a temperature to produce polymer of 300–10,000 $\overline{M}_n$.

8. The process of claims 1 or 2 wherein at least 50 weight % of the constituents of said diluent possess a boiling point under reaction conditions within about ±20° C. of the average boiling point of the α-olefin constituents of the feed stream.

9. The process of claim 1 wherein the contents of the reaction zone are maintained at a temperature below the critical temperature of the α-olefin reactants.

10. The process of claim 1 wherein the diluent is obtained from a refinery stream containing said at least one α-olefin.

11. The process of claim 10 wherein said at least one α-olefin is propylene, butene-1, pentene-1, hexene-1, or octene-1.

12. The process of claim 11 wherein said at least one α-olefin is butene-1 and said diluent comprises other C4 hydrocarbons.

13. The process of claim 11 wherein said at least one α-olefin is propylene and said diluent comprises other C3 hydrocarbons.

14. The process of claim 1 wherein $\overline{M}_n$ of the polymer is controlled to be from about 900 to 8,000.

15. The process of claim 1 wherein the reaction temperature is controlled by evaporative cooling.

16. The process of claim 15 wherein the evaporative cooling is achieved by internal or external reflux.

17. The process of claim 1 wherein the liquid phase is continuously and vigorously mixed by impeller or jet pump.

* * * * *